(12) United States Patent
Jammer

(10) Patent No.: US 8,776,619 B2
(45) Date of Patent: Jul. 15, 2014

(54) SMALL ANGLE SENSOR FOR MEASURING STEERING SHAFT TORQUE

(71) Applicant: Bourns Inc., Riverside, CA (US)

(72) Inventor: Todd Jammer, Birch Run, MI (US)

(73) Assignee: Bourns, Inc., Riverside, CA (US)

( * ) Notice: Subject to any disclaimer, the term of this patent is extended or adjusted under 35 U.S.C. 154(b) by 0 days.

(21) Appl. No.: 13/679,532

(22) Filed: Nov. 16, 2012

(65) Prior Publication Data

US 2013/0125670 A1 May 23, 2013

Related U.S. Application Data

(60) Provisional application No. 61/561,314, filed on Nov. 18, 2011.

(51) Int. Cl.
*G01L 3/00* (2006.01)

(52) U.S. Cl.
USPC .................................................. 73/862.333

(58) Field of Classification Search
USPC ................... 73/862.325, 862.331–862.338
See application file for complete search history.

(56) References Cited

U.S. PATENT DOCUMENTS

| | | | |
|---|---|---|---|
| 4,724,710 A | 2/1988 | Murty | |
| 4,796,463 A | 1/1989 | Tsals et al. | |
| 4,984,474 A | 1/1991 | Matsushima et al. | |
| 5,351,555 A | 10/1994 | Garshelis | |
| 5,520,059 A | 5/1996 | Garshelis | |
| 6,598,490 B2 | 7/2003 | Strothmann | |
| 6,701,792 B2 | 3/2004 | Laidlaw | |
| 6,763,733 B2 | 7/2004 | Tokumoto | |
| 6,810,336 B2 | 10/2004 | Nakane et al. | |
| 6,820,504 B2 | 11/2004 | Toratani et al. | |
| 6,868,744 B2 | 3/2005 | Sugimura et al. | |
| 6,912,923 B2 | 7/2005 | Froehlich et al. | |
| 6,928,887 B2 | 8/2005 | Nakane et al. | |

(Continued)

FOREIGN PATENT DOCUMENTS

| | | |
|---|---|---|
| JP | 1098933 | 4/1989 |
| WO | 2011062431 | 5/2011 |
| WO | 2011062438 | 5/2011 |

OTHER PUBLICATIONS

Angleviel et al., "Development of a Contactless Hall effect torque sensor for Electric Power Steering," SAE International, 2005, 2006-01-0939, pp. 1-8.

*Primary Examiner* — Lisa Caputo
*Assistant Examiner* — Octavia D. Hollington
(74) *Attorney, Agent, or Firm* — Michael Best & Friedrich LLP

(57) ABSTRACT

A small angle sensor for measuring steering shaft torque. The sensor includes a multi-pole magnet and one or more stators. Each of the one or more stators encompasses the outer circumference of the multi-pole magnet. Each of the one or more stators has a horizontal ring section having an inner circumference and an outer circumference; and a plurality of teeth. Each tooth extends in a vertical direction from the inner circumference of the horizontal ring section; and a lip extends in a vertical direction from the outer circumference of the horizontal ring section. The sensor also includes one or more collectors. Each of the one or more collectors encompasses only a portion of the lip of the one or more stators. The sensor includes one or more magnetic sensing elements. Each of the one or more magnetic sensing elements located proximate to the one or more collectors.

5 Claims, 4 Drawing Sheets

(56) References Cited

U.S. PATENT DOCUMENTS

| | | |
|---|---|---|
| 6,928,888 B2 | 8/2005 | Nakane et al. |
| 6,988,422 B2 | 1/2006 | Sugimura et al. |
| 7,028,545 B2 | 4/2006 | Gandel et al. |
| 7,051,602 B2 | 5/2006 | Nakane et al. |
| 7,087,889 B2 | 8/2006 | Shiba |
| 7,174,795 B2 | 2/2007 | Feng et al. |
| 7,246,531 B2 | 7/2007 | Nakane et al. |
| 7,285,949 B2 | 10/2007 | Burns et al. |
| 7,293,472 B2 | 11/2007 | Tokumoto et al. |
| 7,363,825 B2 | 4/2008 | Feng et al. |
| 7,406,884 B2 | 8/2008 | Jerems et al. |
| 7,415,899 B2 | 8/2008 | Tokumoto et al. |
| 7,424,829 B2 | 9/2008 | Yoshikuwa et al. |
| 7,555,963 B2 | 7/2009 | Maehara |
| 7,568,400 B2 | 8/2009 | Tokumoto et al. |
| 7,639,004 B2 | 12/2009 | Islam et al. |
| 7,644,635 B2 | 1/2010 | Prudham et al. |
| 7,707,900 B2 | 5/2010 | Ishihara et al. |
| 7,784,365 B2 | 8/2010 | Masson et al. |
| 7,845,244 B2 | 12/2010 | Aoki et al. |
| 7,954,389 B2 | 6/2011 | Maehara |
| 8,015,885 B2 | 9/2011 | Arita et al. |
| 8,375,810 B2 * | 2/2013 | Bae et al. .................. 73/862.334 |
| 2003/0154800 A1 | 8/2003 | Laidlaw et al. |
| 2004/0194560 A1 | 10/2004 | Froehlich et al. |
| 2006/0123903 A1 | 6/2006 | Gandel et al. |
| 2006/0144166 A1 | 7/2006 | Ruehl et al. |
| 2007/0157741 A1 | 7/2007 | Yoshikuwa et al. |
| 2008/0168845 A1 | 7/2008 | Abe et al. |
| 2008/0282811 A1 | 11/2008 | Hill |
| 2009/0107259 A1 | 4/2009 | Ishihara et al. |
| 2010/0005909 A1 | 1/2010 | Antoni et al. |
| 2010/0018328 A1 | 1/2010 | May |
| 2010/0139419 A1 | 6/2010 | Bastian et al. |
| 2010/0147620 A1 | 6/2010 | Ishihara et al. |
| 2010/0180696 A1 | 7/2010 | Islam et al. |
| 2010/0313681 A1 | 12/2010 | Goll et al. |
| 2010/0319466 A1 | 12/2010 | Bae et al. |
| 2011/0005340 A1 | 1/2011 | Jeon et al. |
| 2011/0126639 A1 | 6/2011 | Behrens |
| 2011/0167920 A1 | 7/2011 | Rink et al. |

* cited by examiner

US 8,776,619 B2

SMALL ANGLE SENSOR FOR MEASURING STEERING SHAFT TORQUE

BACKGROUND

The present invention relates to torque sensors. More particularly, the invention relates to a torque sensor that magnetically measures the torque applied to a set of shafts, most typically in an automotive steering system.

A torque may be measured in a system that has an input shaft and output shaft and a compliant shaft or torsion bar that connects the two shafts. A magnetic sensor is fitted on or placed at the interface of the two shafts. The sensor may include a magnet, a stator, a collector, and a magnetic sensing element. The torsion bar has a known spring constant or torsional rigidity. Rotational movement of the input shaft with respect to the output shaft produces a relative angular displacement between the two. The angular displacement is proportional to the torque exerted on the input shaft (such as by a person turning a steering wheel). The angular displacement is then measured using known magnetic principles.

SUMMARY

While magnetic torque sensors exist, they still suffer from a number of deficiencies, including poor manufacturability and integrability with other steering system components. In one embodiment, the invention provides a small angle sensor for measuring steering shaft torque. The sensor includes a multi-pole magnet and one or more stators. Each of the one or more stators encompasses the entire outer circumference of the multi-pole magnet. Each of the one or more stators has a horizontal ring section having an inner circumference and an outer circumference; and a plurality of teeth. Each tooth extends in a vertical direction from the inner circumference of the horizontal ring section. A lip extends in a vertical direction from the outer circumference of the horizontal ring section. The sensor also includes one or more collectors. Each of the one or more collectors encompasses only a portion of the lip of the one or more stators. One or more magneto or magnetic sensing elements are included in the sensor. Each of the one or more magnetic sensing elements is located proximate to at least one of the collectors.

In another embodiment the invention provides a method of measuring steering shaft torque using a small angle sensor. The method includes positioning a multi-pole magnet on an input shaft of a steering system and positioning one or more stators on an output shaft of the steering system. The one or more stators have a horizontal ring section with an inner circumference and an outer circumference; and a plurality of teeth. Each tooth extends in a vertical direction from the inner circumference of the horizontal ring section. A lip extends in a vertical direction from the outer circumference of the horizontal ring section. The method further includes encompassing only a portion of the outer circumference of the one or more stators with one or more collectors and using one or more magneto or magnetic sensing elements to sense a magnitude and a polarity of magnetic flux created by the multi-pole magnet and the one or more stators. The method further includes providing a zero position when the multi-pole magnet and the one or more stators are rotationally aligned and the magnitude and the polarity of the magnetic flux are equal to a net zero magnetic flux. The magnitude and the polarity of the magnetic flux are proportional to an angular position of the multi-pole magnet relative to the one or more stators. The angular position of the multi-pole magnet relative to the one or more stators is equal to an angular position of the input shaft of the steering system relative to the output shaft of the steering system.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
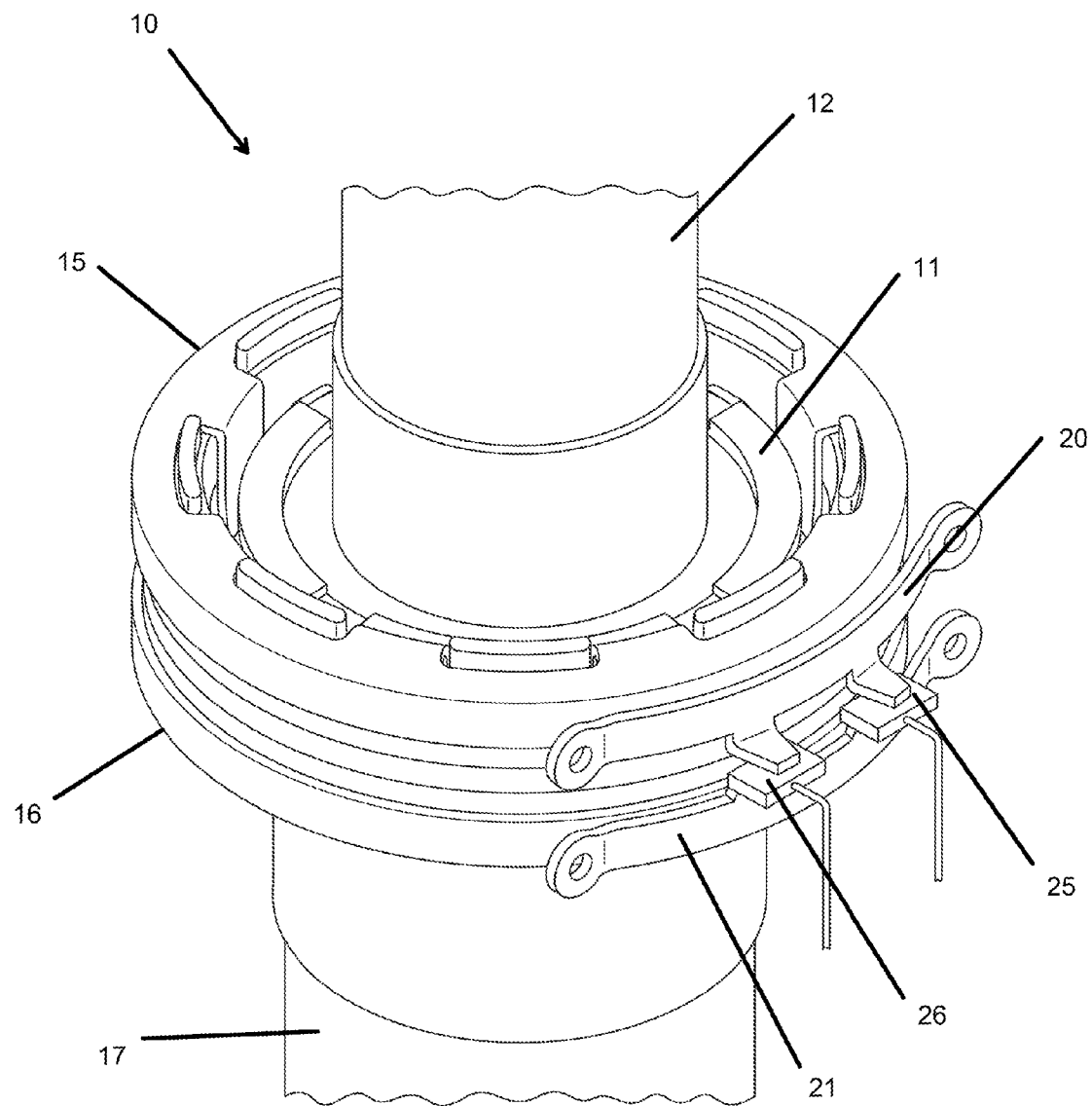
FIG. 1 is a perspective view of a small angle sensor for measuring steering shaft torque.

FIG. 1 illustrates a small angle sensor 10 for measuring steering shaft torque. The small angle sensor 10 includes a multi-pole magnet 11 attached to an input shaft 12 of a steering system. The small angle sensor 10 also includes a set of stators 15 and 16, which are attached to an output shaft 17 of a steering system. The stators 15 and 16 surround or encompass the entire outer circumference of the multi-pole magnet 11. The input shaft 12 and output shaft 17 are connected by a torsion bar (not shown). The torsion bar has a torsional rigidity or torsion spring constant of a predetermined or known amount. Rotational motion of the input shaft relative to the output shaft produces a relative angular displacement between the output shaft 17 and input shaft 12 proportional to the torque exerted.

Figure 2:
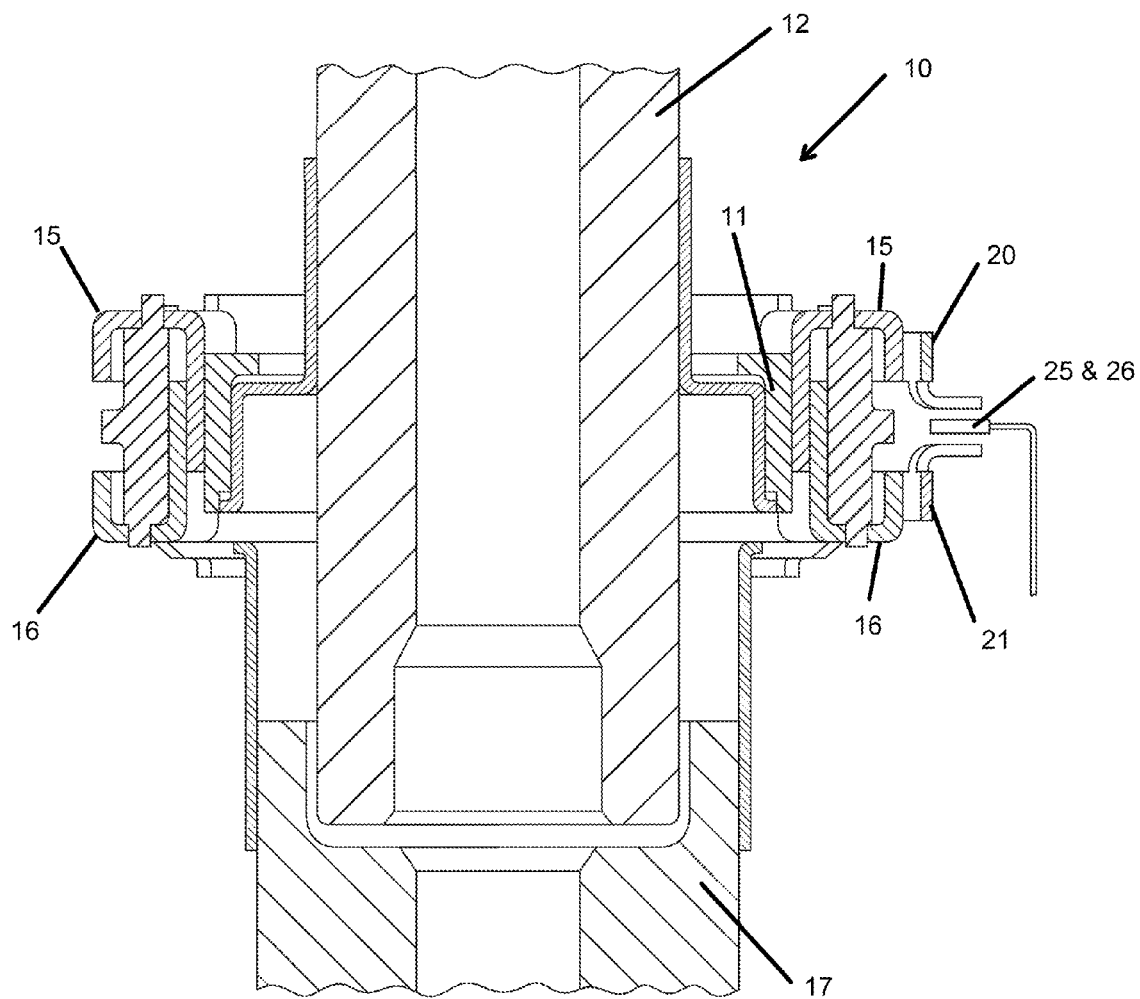
FIG. 2 is a cross-sectional view of the small angle sensor illustrated in FIG. 1.

A set of collectors 20 and 21 encompasses or surrounds only a portion or part of the outer circumference of the stators 15 and 16. Placed in close proximity to the collectors 20 and 21 are magneto or magnetic sensing elements (or sensors) 25 and 26. The sensing elements 25 and 26 sense the magnitude and polarity of the magnetic flux created by the multi-pole magnet 11 and conducted through the stators 15 and 16. Collectors 20 and 21 collect the magnetic flux. FIG. 2 illustrates a cross section of the small angle sensor 10.

Figure 3:
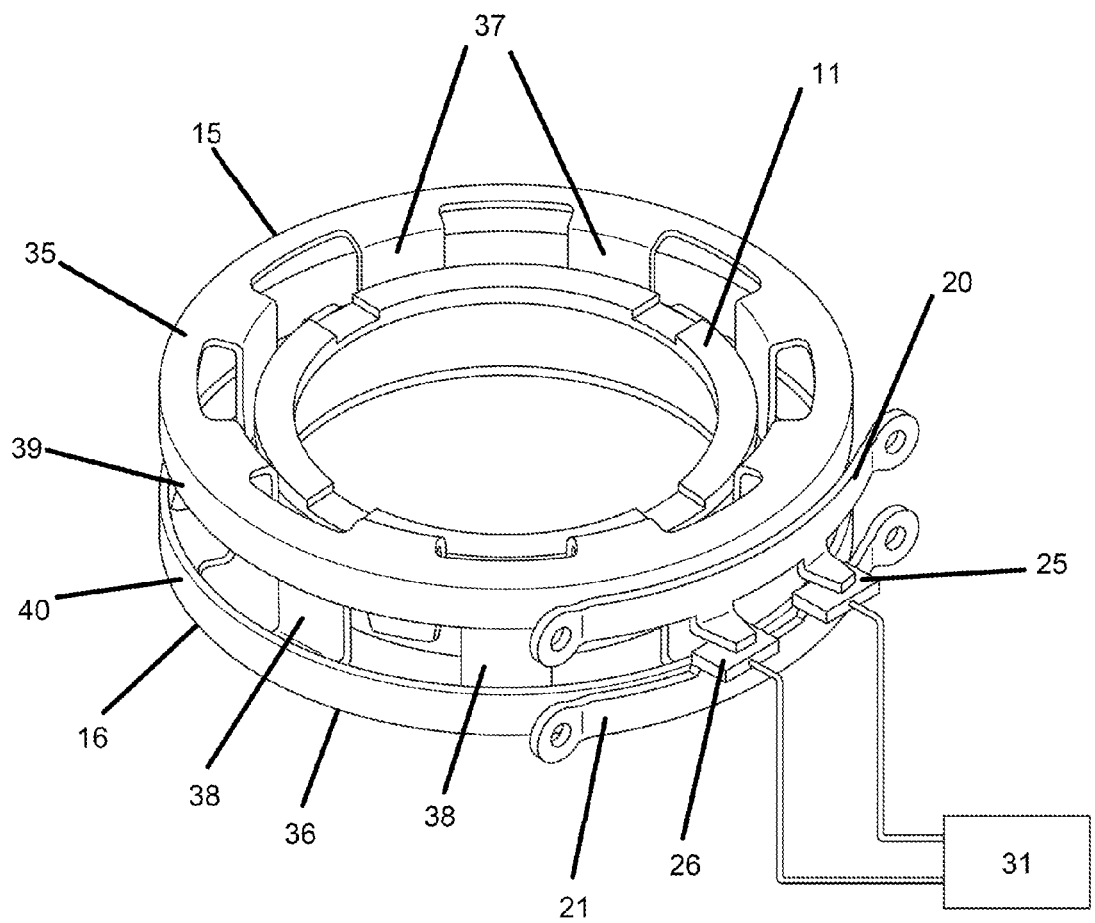
FIG. 3 illustrates the multi-pole magnet, stators, collectors, magnetic sensing elements, and microcontroller of the small angle sensor illustrated in FIG. 1.
Figure 4:
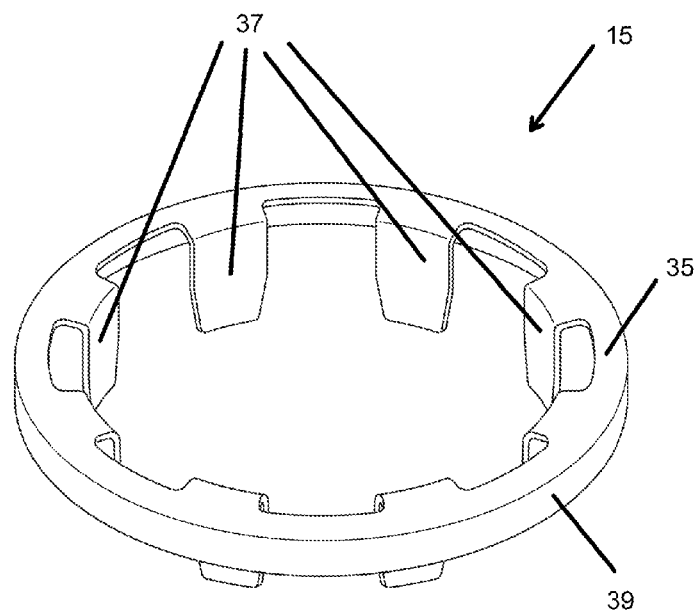
FIG. 4 illustrates a stator of the small angle sensor illustrated in FIG. 1.

FIG. 3 illustrates the multi-pole magnet 11, stators 15 and 16, collectors 20 and 21, magnetic sensing elements 25 and 26, and microcontroller 31 of the small angle sensor 10. Each stator 15 and 16 includes a horizontal ring section: sections 35 and 36. Extending in a vertical direction from the inner circumference of the horizontal ring sections 35 and 36 are two sets of teeth 37 and 38. Extending in a vertical direction from the outer circumference of the horizontal ring sections 35 and 36 are lips 39 and 40. The number of teeth in a stator depends on the number of poles of the multi-pole magnet 11. FIG. 4 illustrates one of the stators 15, including the horizontal ring section 35, the plurality of teeth 37, and the lip 39.

As shown in FIG. 3 the collectors 20 and 21 encompass or surround only a portion or part of the lips 39 and 40 of the stators 15 and 16. It is believed that the lips 39 and 40 of the stators 15 and 16 make assembling the device in an axial manner easier. The lips also reduce sensitivity to axial movement of the components when making measurements. That is, the sensor is less sensitive to misalignment of the stators and collectors. Constructing the collectors 20 and 21 so that they encompass only a portion of the lips 39 and 40 of the stators 15 and 16 provides advantages of low manufacturing costs and decreased size of the small angle sensor 10. FIG. 3 further shows the magnetic sensing elements 25 and 26 in close proximity to the collectors 20 and 21. The magnetic sensing elements 25 and 26 are then electrically coupled to the microcontroller 31.

In operation, when torque is exerted on the system, the torsion bar (not shown) regulates the relative angular displacement between the output shaft 17 and the input shaft 12. The relative angular displacement of the output shaft 17 and the input shaft 12 is equivalent to the angular displacement between the multi-pole magnet 11 (which is attached to the input shaft 12) and the set of stators 15 and 16 (which are attached to the output shaft 17). The zero position of the system is the position where there is zero or no torque exerted on the system and no angular displacement between the multi-pole magnet 11 and the set of stators 15 and 16. At the zero position, the multi-pole magnet 11 and the set of stators 15 and 16 produce a net zero magnetic flux. When torque is exerted on the system, there is an angular displacement between the multi-pole magnet 11 and the set of stators 15 and 16. The angular displacement between the multi-pole magnet 11 and the set of stators 15 and 16 changes the magnetic field or amount of magnetic flux. The greater the angular displacement, the greater the change in magnetic flux.

Figure 5:
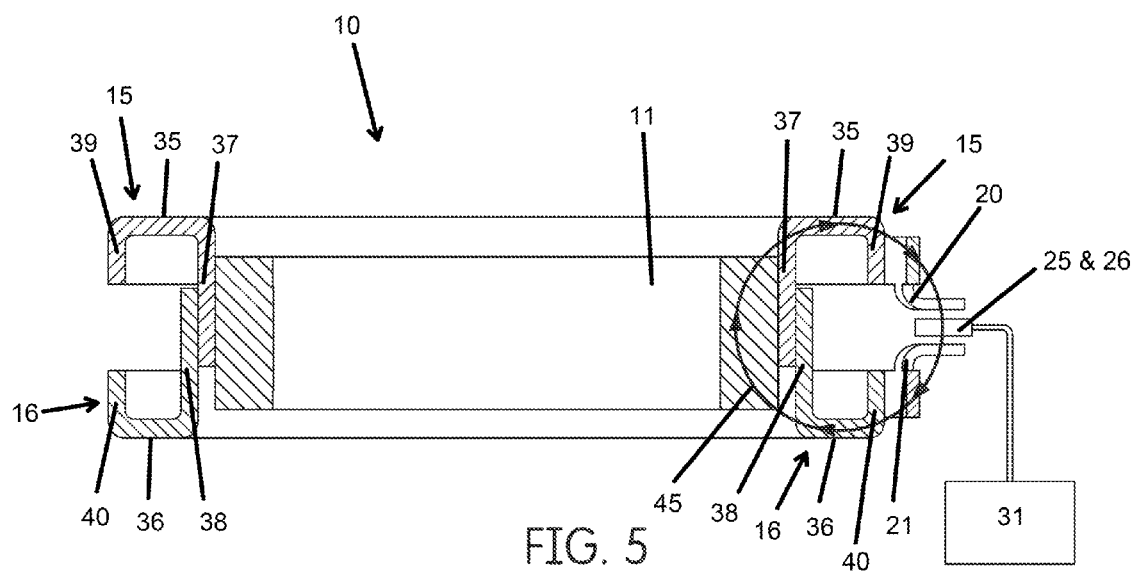
FIG. 5 is a cross-sectional view of the small angle sensor illustrated in FIG. 1 showing the magnetic flux line. The proportions of the components have been changed to better illustrate the magnet flux line.

As shown in FIG. 5, a magnetic flux path 45 flows in a radial direction away from the multi-pole magnet 11. The magnetic flux path 45 travels from the multi-pole magnet 11, through the stator teeth 37 of the stator 15, out the lip 39 of stator 15 to collector 20. The magnetic flux path 45 then passes through the magnetic sensing elements 25 and 26 to the other collector 21. The magnetic flux path 45 then travels through the other lip 40 of the other stator 16, through the stator teeth 38 of the other stator 16 and back to the multi-pole magnet 11. The magnitude and polarity of the magnetic flux path 45 sensed by the magnetic sensing elements 25 and 26 is used by the microprocessor 31 to calculate the torque exerted on the system. The magnetic flux path 45 traveling in a radial direction, rather than an axial direction, allows for the components of the sensor 10 to be assembled in an axial direction. The components being assembled in an axial direction enables more flexible and economic manufacturing, further reducing the overall sensor and steering system cost.

A small air gap exists between the collectors 20 and 21 and the stators 15 and 16. This small air gap allows the input shaft 12 and the output shaft 17, and the attached multi-pole magnet 11 and stators 15 and 16, to rotate freely while the collectors 20 and 21, magnetic sensing 25 and 26, and microprocessor 31 remain stationary.

Thus, the invention provides, among other things, a new and improved small angle sensor for measuring steering shaft torque. Various features and advantages of the invention are set forth in the following claims.

What is claimed is:

1. A small angle sensor for measuring steering shaft torque, the sensor comprising:
    a multi-pole magnet having an outer circumference;
    one or more stators, each of the one or more stators encompassing the outer circumference of the multi-pole magnet, each of the one or more stators having;
        a horizontal ring section having an inner circumference and an outer circumference;
        a plurality of teeth, each tooth extended in a vertical direction from the inner circumference of the horizontal ring section; and
        a lip extended in a vertical direction from the outer circumference of the horizontal ring section;
    one or more collectors, each of the one or more collectors encompassing only a portion of the lip of the one or more stators; and
    one or more magnetic sensing elements, each of the one or more magnetic sensing elements located proximate to the one or more collectors.

2. The small angle sensor of claim 1, further comprising:
    a microcontroller connected to the one or more magnetic sensing elements.

3. The small angle sensor of claim 1, wherein the number of teeth in the plurality of teeth depends on the number of poles in the multi-pole magnet.

4. The small angle sensors of claim 1, wherein a magnetic flux path flows in a radial direction away from the multi-pole magnet and travels from the multi-pole magnet through the at least one of the plurality of teeth, out the lip of at least one of the one or more stators to at least one of the one or more collectors, and through at least one of the one or more magnetic sensing elements to another of the one or more collectors.

5. A method of measuring steering shaft torque using a small angle sensor, the method comprising:
    positioning a multi-pole magnet on an input shaft of a steering system;
    positioning one or more stators on an output shaft of the steering system, the one or more stators having;
        a horizontal ring section having an inner circumference and an outer circumference;
        a plurality of teeth, each tooth extended in a vertical direction from the inner circumference of the horizontal ring section; and
        a lip extended in a vertical direction from the outer circumference of the horizontal ring section;
    encompassing only a portion of the outer circumference of the one or more stators with one or more collectors;
    using one or more magnetic sensing elements to sense a magnitude and a polarity of a magnetic flux created by the multi-pole magnet, the one or more stators, and the one or more collectors;
    providing a zero position when the multi-pole magnet and the one or more stators are rotationally aligned and the magnitude and the polarity of the magnetic flux are equal to a net zero magnetic flux;
    wherein the magnitude and the polarity of the magnetic flux are proportional to an angular position of the multi-pole magnet relative to the one or more stators; and
    wherein the angular position of the multi-pole magnet relative to the one or more stators is equal to an angular position of the input shaft of the steering system relative to the output shaft of the steering system.

* * * * *